United States Patent [19]
De Larminat et al.

[11] Patent Number: 5,831,256
[45] Date of Patent: Nov. 3, 1998

[54] ELECTRONIC CARD READER FOR READING CARDS OF DIFFERENT FORMATS, AND PORTABLE TELEPHONE INCLUDING SUCH A READER

[75] Inventors: Alain De Larminat, Saumur; Laurent Jubert, Change, both of France

[73] Assignee: U.S. Philips Corporation, New York, N.Y.

[21] Appl. No.: 802,963

[22] Filed: Feb. 21, 1997

[30] Foreign Application Priority Data

Feb. 28, 1996 [FR] France .................................. 96 02490

[51] Int. Cl.$^6$ ...................................................... G06K 7/00
[52] U.S. Cl. ........................ 235/486; 235/439; 235/441; 235/483; 235/492; 379/433; 455/558
[58] Field of Search ................................... 235/492, 439, 235/440, 441, 451, 475, 483, 486; 379/428, 429, 433; 455/558

[56] References Cited

U.S. PATENT DOCUMENTS

| | | | |
|---|---|---|---|
| 4,743,746 | 5/1988 | Murschall et al. ...................... | 235/486 |
| 4,827,113 | 5/1989 | Rikuna ..................................... | 235/435 |
| 4,926,032 | 5/1990 | Shimamura et al. ................... | 235/441 |
| 5,257,414 | 10/1993 | Trahan et al. ....................... | 235/486 X |
| 5,276,317 | 1/1994 | Ozouf et al. ............................. | 235/486 |
| 5,325,429 | 6/1994 | Kurgan ..................................... | 379/429 |
| 5,336,877 | 8/1994 | Raab et al. ............................... | 235/475 |
| 5,371,791 | 12/1994 | Schwartz et al. ....................... | 379/433 |
| 5,436,969 | 7/1995 | Kobayashi .......................... | 379/428 X |
| 5,508,501 | 4/1996 | Fujimoto et al. ................... | 235/486 X |
| 5,615,260 | 3/1997 | Kurgan ............................... | 379/429 X |
| 5,718,609 | 2/1998 | Braun et al. ........................ | 235/441 X |
| 5,726,432 | 3/1998 | Reichardt ................................ | 235/441 |

FOREIGN PATENT DOCUMENTS

0556970A1  8/1993  European Pat. Off. .

*Primary Examiner*—Donald T. Hajec
*Assistant Examiner*—Michael G. Lee
*Attorney, Agent, or Firm*—Dicran Halajian

[57] ABSTRACT

A portable telephone includes an electronic card reader for reading Micro SIM cards of different formats. The reader has a wall with a card supporting side and a connector whose resilient contact terminals protrude from the supporting side through an opening. For holding a small-format card in the reading position, the wall has a recess for receiving the small-format card while the card is in contact with the contact terminals of the connector, in the lower portion of which recess is accommodated a sheet steel adapter integral with the wall, which an adapter has a clearance in a normal direction to the wall at least equal to the thickness of the small-format card and has a hole opposite the opening.

9 Claims, 3 Drawing Sheets

ELECTRONIC CARD READER FOR READING CARDS OF DIFFERENT FORMATS, AND PORTABLE TELEPHONE INCLUDING SUCH A READER

BACKGROUND OF THE INVENTION

The present invention relates to an electronic card reader for reading a large or a small card by means of an adapter which has a large or small format respectively, but which cards have the same contact configuration, this reader having a wall with a directly accessible card supporting side and a connector whose resilient contact terminals slightly protrude from said card supporting side through an opening in said wall.

The invention likewise relates to a portable telephone including such a reader.

In the field of portable cellular radiotelephones, notably GSM (Global Standard Mobile), for example, a memory circuit, such as an electronic card is known to be used which can be removably inserted into the telephone. Data notably relating to the identity of the user are read from the card which has been inserted and these data are then used during subsequent operation of the apparatus.

The electronic card may be, for example, a card called chip card or smart card of the ISO format which is the format of a common credit card and which has a memory arranged in the form of an integrated circuit. This circuit and its external contacts, or contact terminals, which are flush with the surface of the card in fact occupy only a very small part of this card as regards volume and surface.

In modern telecommunication systems, the applications linked with the use of chip cards are on the increase. One of these applications relates to the circuit called Subscriber Identity Module (SIM) proposed for the pan-European digital cellular radiotelephone system. On this subject reference be made to Recommendation GSM 11.11 of ETSI, which describes the specifications and the recommendations GSM 02.17 which relate to the functional characteristic features of the SIM.

Two different mechanical standards are proposed for the GSM SIM card. The functionalities are the same for the two sizes, but the physical dimensions differ, except for the thickness of the cards which is equal to 0.8 mm. These two standards are the ISO SIM, also called large card in the present text, having the dimensions of a credit card, and the Micro SIM, or small card, which measures 20 mm×25 mm. The ISO SIM is relatively large and the need for smaller cards is felt as the miniaturization continues to reduce the size of the radiotelephone handset itself. The reduction of the card to the Micro SIM format is favorable to this miniaturization effort.

In principle, a radiotelephone is designed for receiving either of the two SIM cards mentioned above which both exist. For a smoother use it is desirable to design a radiotelephone which is suitable for receiving either SIM card. This may be found to be necessary when one wishes to lend one's radiotelephone to a person who has a SIM card of a different format from that of the owner of the apparatus. A solution to this technical problem is known, notably from European Patent No. 0 556 970 A1. The radiotelephone which is described there comprises an adapter which is placed in a cavity so as not to form an obstacle to the insertion of the card when the adapter is arranged in the reading mode of a chip card of the larger format and, when arranged in the reading mode of a Micro SIM card, or smaller format, tilts by means of a pivot link and presses the contact pads of the card against the corresponding terminals of the electronic card reader. The pivotal mounting used presents one drawback: while the adapter is tilted, it protrudes from the body of the apparatus and then becomes vulnerable to shock. Furthermore, this solution is not favorable to a reduced bulkiness in the reader of the radiotelephone, since the latter is suitable for containing the two cards at the same time, the large one in the reading position and the small one in the storage position while the two are overlying each other.

OBJECTS AND SUMMARY OF THE INVENTION

It is an object of the invention to provide a single adapter for a Micro SIM card in an electronic card reader which adapter does not increase the cumbersomeness for positioning a card of the ISO SIM format in the card reader.

A further object of the invention is that an adapter for a Micro SIM card is always irremovably present in an electronic card reader.

A still further object of the invention is that a Micro SIM card is precisely put in the reading position in an electronic card reader in a simple and economic manner.

According to the invention, these objects are achieved and the drawbacks of the prior art obviated or suppressed due to the fact that the reader defined in the opening paragraph is characterized in that, for holding said small card in the reading position, said wall has a recess around said opening, which recess is intended for receiving the small-format card while the contact pins abut the contact terminals of said connector, while said adapter made of a steel sheet is accommodated at the bottom of the recess integral with said wall with a clearance in the normal direction to the wall, which clearance is at least equal to the thickness of said small card, and has a hole opposite said opening.

For the adapter to be integral with the wall, the adapter may have several lugs of which the curved end obstructs the extraction of this adapter once it has been put in place. The fact that the adapter is made of a thin plate enables this adapter to disappear completely in the recess (compartment) provided in above wall and thus not to hinder an ISO SIM card being put in place when there is no Micro SIM card present.

Moreover, for a precise positioning of the Micro SIM card, the wall with its recess may be provided by injection molding, so that the very sides of the recess guide and maintain the small card in the reading position.

These and other aspects of the invention are apparent from and will be elucidated with reference to the embodiments described hereinafter.

BRIEF DESCRIPTION OF THE DRAWINGS

In the drawings:

FIGS. 4.1 and 5.1 illustrate along the lines IV—IV and V—V of FIG. 2 in a cutaway view a second embodiment of the invention;

Like references in the drawing Figures represent like elements having like functions.

DETAILED DESCRIPTION OF THE PREFERRED EMBODIMENT

Figure 1:
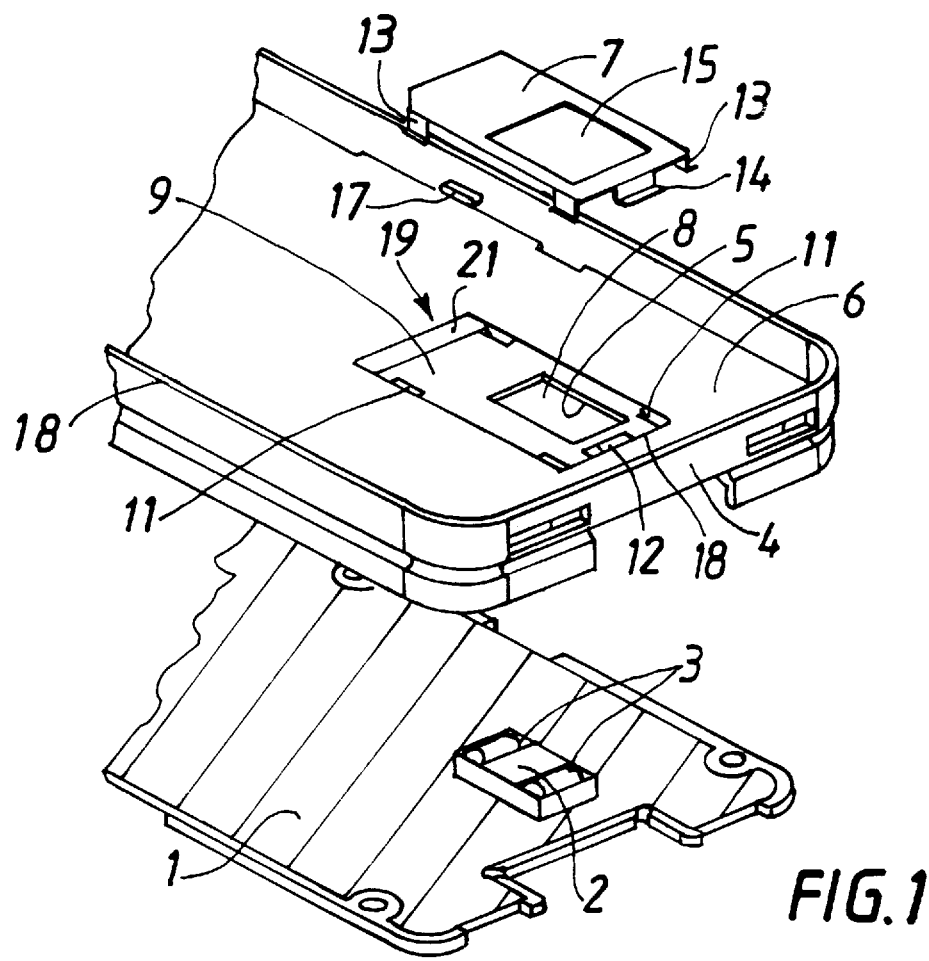
FIG. 1 is a cutaway exploded perspective view of a first embodiment of the invention.

From the electronic apparatus represented in FIG. 1, for example, a portable telephone, is only shown an electronic card reader intended for reading a large or small electronic card (not shown). For this purpose, a connector 2 having protruding resilient contact terminals such as 3 (among other components not shown) is fixed to a printed circuit board 1. A chassis 4 has a wall 5 with a flat outside surface 6. An adapter 7 which forms the core of the invention is intended to keep a small electronic card called Micro SIM card in the reading position when the apparatus is a portable telephone, the large card thus being a card called chip card having the format of a credit card and being called an ISO SIM card or Full SIM card. When the card 1 of the printed circuit is mounted on the chassis 4, the contact terminals 3 slightly protrude outward, beyond surface 6 through an opening 8 in the wall 5. According to the invention the wall 5 has in surface 6 a recess 9 in the form of a shallow rectangular compartment provided around the opening 8, having the same format as the small card with slightly larger lateral dimensions. Around the perimeter of the recess 9 are provided apertures such as 11 and 12 for receiving lugs such as 13 and 14 of the adapter 7. Preferably, the chassis 4 is made of plastic material such as polycarbonate or ABS by injection molding, including the recess 9 and the apertures 11 and 12.

Figure 2:
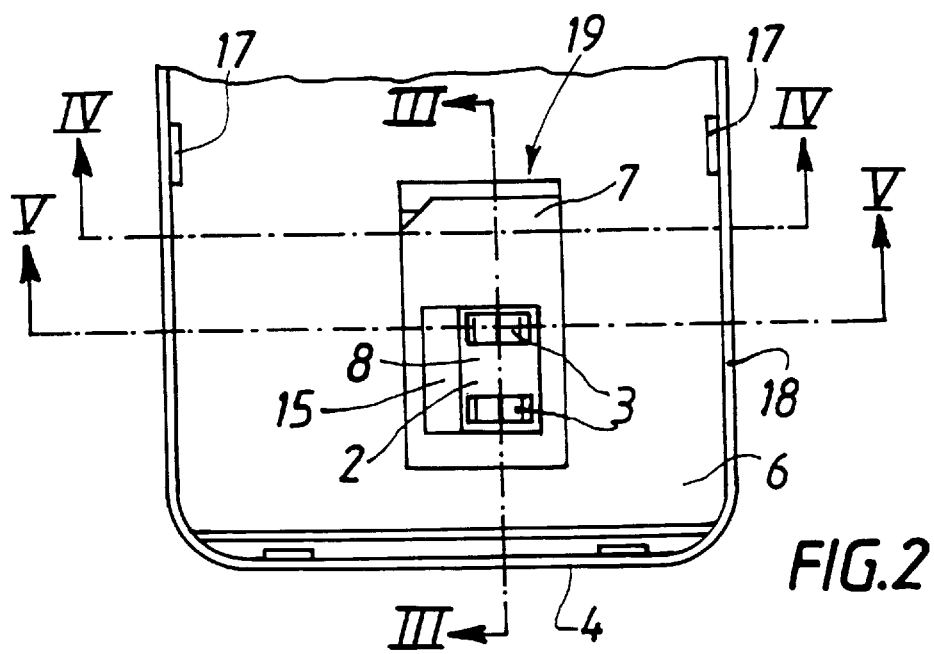
FIG. 2 is a cutaway plan view of the first embodiment of the invention.

The depth of the recess 9 is several tenths of a millimeter, typically equal to 0.3 mm. The adapter 7 is made of thin sheet steel, for example, stainless steel such as nickelsteel having a thickness which is slightly less than the depth of the recess 9 and typically equal to 0.2 mm. The adapter 7 is put in place by force fitting the lugs 13, 14 in the corresponding apertures 11, 12 until its top surface completely fits in the recess 9, that is to say, slightly sunk into the recess relative to the surface 6. A hole 15 provided in the adapter 7 opposite the opening 8 allows the contact terminals 3 to pass through, as can be seen in FIG. 2.

In this position everything goes as if the adapter 7 were absent and it is possible to slide an ISO SIM (not shown) card underneath the lugs 17 against the side 9 in the reading position while this card is laterally maintained in a fixed position by the raised edge 18 which fits exactly around the card.

If one wishes to adapt the apparatus to a small card, notably the Micro SIM card, one must make certain that there is no large card present in the apparatus and if there is, extract the large card therefrom and then proceed as shown in a cross-sectional view in FIG. 3 by inserting the small card into the recess 9. It will be noticed that for permitting this manipulation a free side 19 is preferably disengaged along the perimeter of the recess 9. Moreover, the adapter 7 is preferably permanently fixed to the wall 5, maintained in a fixed position by the curved ends of the lugs against the inside face of the wall 5, with a clearance at the front in a normal direction to the wall, which clearance is at least equal to the thickness of the small card, that is to say, 0.8 mm for a Micro SIM card.

To facilitate the insertion or extraction respectively, of the small card, the free side 19 may have a depression 21 which forms a groove under the corresponding free side of the adapter 7.

Figure 3A:
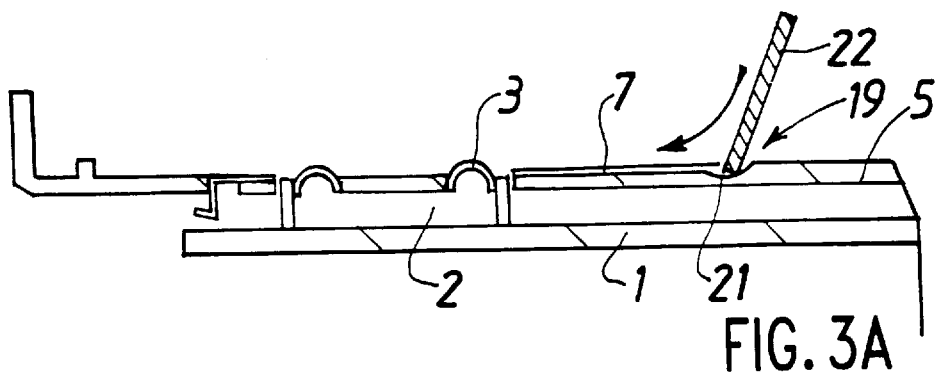
FIGS. 3A, 3B, 3C are sections along the line III—III of FIG. 2, showing the insertion of the small card under the adapter according to the invention.
Figure 3B:
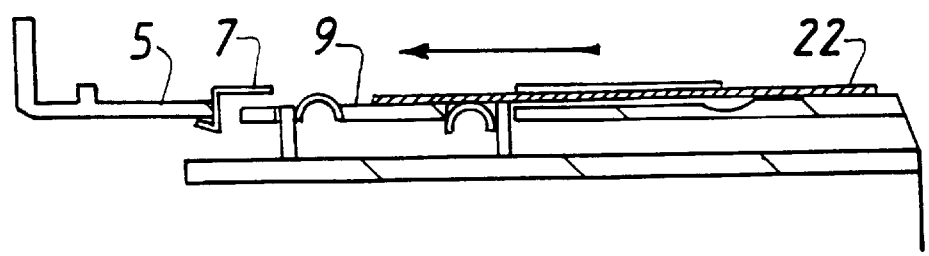
Figure 3C:
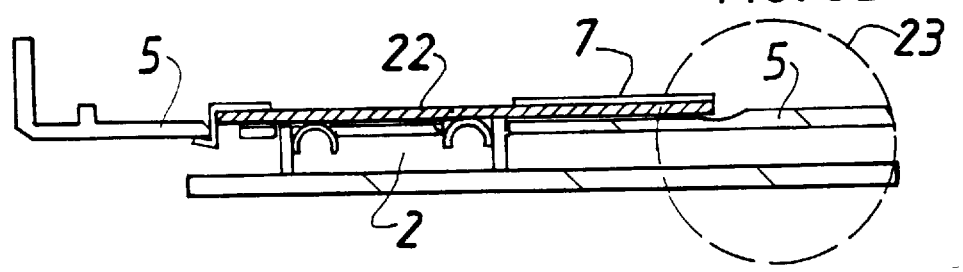

FIG. 3A shows the start of the insertion of the small card 22 of which the front edge at 21 lifts the corresponding edge of adapter 7. In FIG. 3B the card is partly slipped at a slight slope into the recess 9 and in FIG. 3C the small card is fully abutted against the bottom of the recess 9 and laterally held in position either by the lugs 13 and 14, which forms the first embodiment of the FIGS. 1, 4 and 5, or by the edges of the recess, in conformity with the second embodiment of the FIGS. 4.1 and 5.1. In the position of FIG. 3C, the contact pads of the card 22 rest against the terminals of the connector 2 with a suitable pressure for proper electrical contact. It will be noticed that this pressure, which is due to the elasticity of the contact terminals 3, is slightly higher than for the large card (ISO SIM), being given that the small card is slightly sunk into the recess 9.

Figure 4:
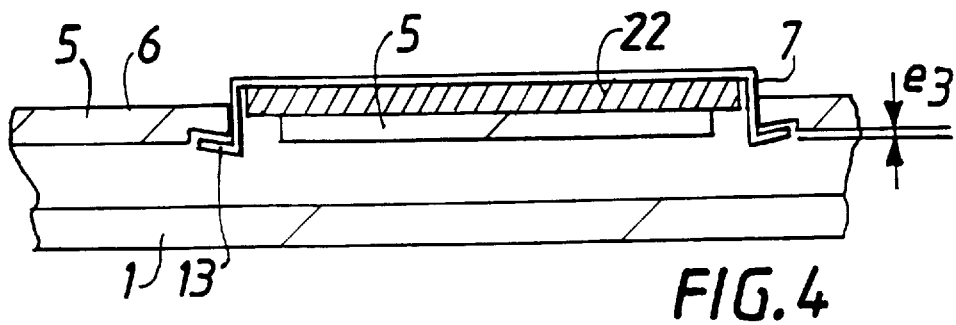
FIGS. 4 and 5 illustrate along the lines IV—IV and V—V of FIG. 2 in a cutaway view the first embodiment of the invention.
Figure 5:
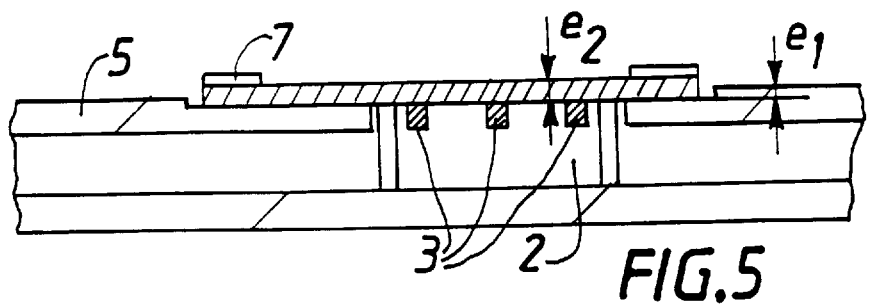

The FIGS. 4, 5 and 4.1, 5.1 make it possible to give a better explanation of the first and second embodiments of the invention, along a section perpendicular to that of FIG. 3.

The first mode of the FIGS. 4 and 5 implies a polished finishing of the adapter 7, because it is the spacing between lugs that determines the correct lateral distance of the small card 22 with tolerances which are necessarily rather small. In the FIGS. 4 and 5 the thickness e1 can be noticed which is the depth of the recess, the thickness e2 of the small card 22 and the clearance e3 of the order of 0.1 mm which makes it possible to insert and extract the card without particular effort.

For the second embodiment of the FIGS. 4.1 and 5.1, the apertures 11 and 12 for the lugs 13 and 14 to pass through are made as protrusions outside the perimeter of the recess and it is the very edges of the recess which assume the function of laterally maintaining the small card 22 in the fixed position. This second embodiment is particularly advantageous when the recess is realized by injection molding of the wall 5 because in that case a precise relative position of the recess 9 and of the connector 2 is easy enough to make with current techniques, which, in return, does not imply too polished a finishing of the adapter 7 and in exchange diminishes the cost.

Figure 6:
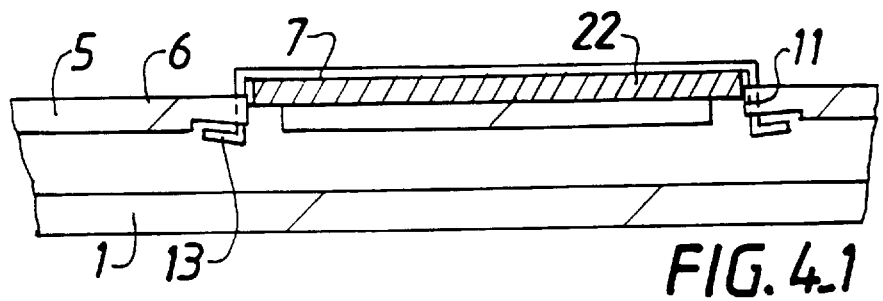
FIG. 6 is an enlarged part of FIG. 3C where a retaining member for the small card is represented.
Figure 6:
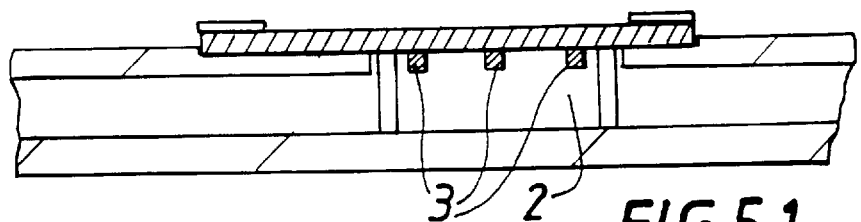
Figure 6:
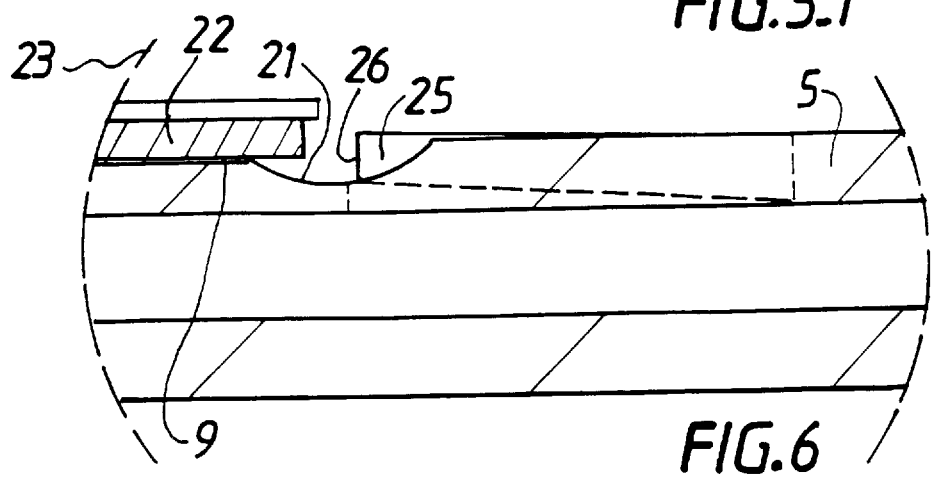

FIG. 6 shows an improvement of the invention, the selected mode of representation being an enlargement of the dash-and-dot circle 23 of FIG. 3C.

When the small card is in place in the recess 9 with a slight clearance indicated above, there must be avoided that a sideways shock can shift it to the point where it is electrically disconnected. For this purpose, a retaining member 25 can be provided. This member 25, slightly elastic in the way of a leaf spring can be provided in the wall 5 itself, for example, by injection molding. The end 26 of the member 25 opens on the free side of the recess 9 and serves as a near stop which prevents the backward movement of the small card 22. For putting the small card in place and extracting it, this member can be simply tilted due to its elasticity, notably to beyond the notch 21 by pressing its end in the wall 5. Advantageously, the lower part of the member is made thinner towards the inside so as not to protrude from the wall 5 when it is tilted.

Figure 7:
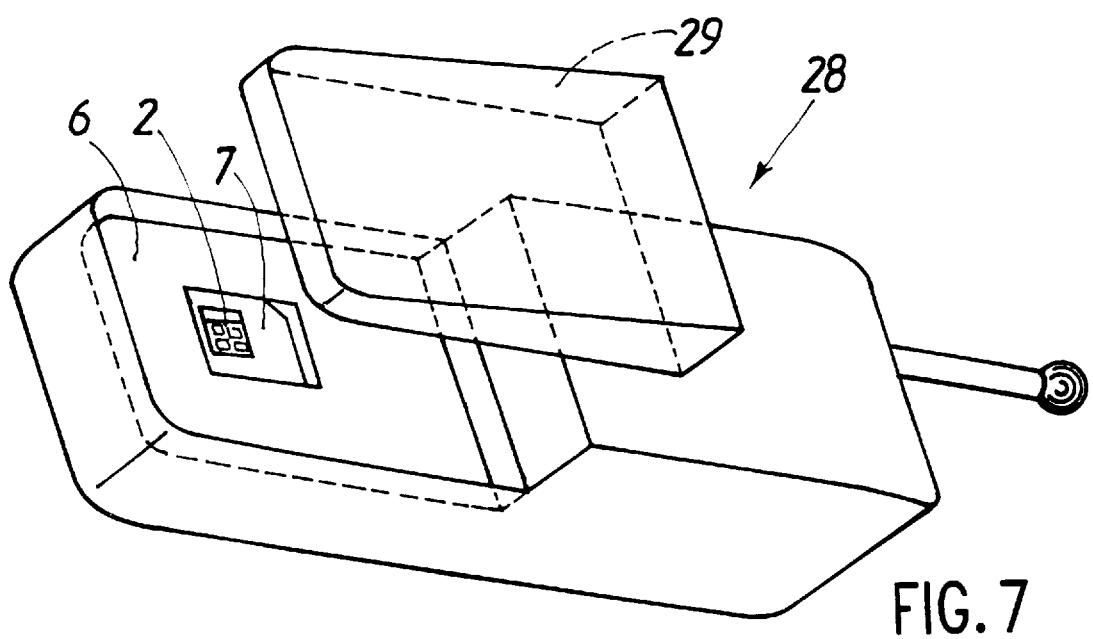
FIG. 7 represents a portable telephone incorporating an electronic card reader according to the invention.

FIG. 7 is a diagrammatic perspective view of a portable telephone 28 incorporating an electronic card reader as described above, for reading an ISO SIM or a Micro SIM card. As shown, the portable telephone 28 may comprise a removable casing 29 which contains, for example, a battery which provides the electric power supply of the apparatus. The removable casing 29 makes easy access to the connector 2 possible and, when joined to the apparatus, this casing contributes to maintaining the electronic ISO SIM or Micro SIM card in the reading position against the side 6 of the wall 5.

We claim:

1. An electronic card reader for reading a large-format or a small-format card by means of an adapter which has a large or small format respectively, but which cards have same contact configuration, said reader having a wall with a directly accessible card supporting side and a connector whose resilient contact terminals slightly protrude from said card supporting side through an opening in said wall characterized in that, for holding said small-format card in a reading position, said wall has a recess around said opening, which recess is intended for receiving the small-format card with contact pins that abut the contact terminals of said connector, while said adapter made of a steel sheet is accommodated at a bottom of the recess integral with said wall with a clearance in a normal direction to the wall, which clearance is at least equal to a thickness of said small card, and has a hole opposite said opening.

2. An electronic card reader as claimed in claim 1, wherein said wall is manufactured by injection molding.

3. An electronic card reader as claimed in claim 1, characterized in that, for the adapter to be integral with said wall, the adapter has at least three retaining lugs which pass through said wall through apertures provided for this purpose, a free side being disengaged around a perimeter of said recess for introducing or extracting said small-format card.

4. An electronic card reader as claimed in claim 3, characterized in that said openings are provided on an outside of the perimeter of said recess.

5. An electronic card reader as claimed in claim 3, characterized in that at a location of said free side, an edge of the recess comprises a depression for introducing or extracting said small-format card.

6. An electronic card reader as claimed in claim 1, characterized in that said reader further comprises retaining means for retaining said small-format card in said recess.

7. An electronic card reader as claimed in claim 6, characterized in that said retaining means are formed by an elastic member provided in said wall by notching into a latter and whose end situated on a free side of the recess forms a stop for said small-format card after said small-format card has been put in place.

8. A portable telephone incorporating an electronic card reader as claimed in claim 1, wherein said large-format or said small-format card includes a large ISO SIM card or a small Micro SIM card.

9. A portable telephone incorporating an electronic card reader as claimed in claim 1, further comprising a removable casing which in an operating position is fixed to the electronic card reader.

\* \* \* \* \*